United States Patent
Pollman

(10) Patent No.: US 6,626,785 B2
(45) Date of Patent: Sep. 30, 2003

(54) HYDROMECHANICAL TRANSMISSION

(75) Inventor: Frederic W. Pollman, Eden Prairie, MN (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/986,215

(22) Filed: Oct. 22, 2001

(65) Prior Publication Data

US 2002/0082130 A1 Jun. 27, 2002

Related U.S. Application Data

(60) Provisional application No. 60/257,456, filed on Dec. 21, 2000.

(51) Int. Cl.[7] ............................................... F16H 47/04
(52) U.S. Cl. ........................................................ 475/82
(58) Field of Search ............................... 475/80, 81, 82, 475/83

(56) References Cited

U.S. PATENT DOCUMENTS

| | | | | |
|---|---|---|---|---|
| 3,455,184 A | * | 7/1969 | Frandsen et al. | 475/82 X |
| 3,783,711 A | * | 1/1974 | Orshansky, Jr. | 475/81 |
| 3,903,756 A | * | 9/1975 | Hamma | 475/82 X |
| 4,019,404 A | * | 4/1977 | Schauer | 475/82 |
| 4,259,881 A | * | 4/1981 | Meyerle | 475/72 |
| 4,637,275 A | * | 1/1987 | Whalen | 475/72 |
| 5,667,452 A | * | 9/1997 | Coutant | 475/81 |
| 6,338,689 B1 | * | 1/2002 | Pollman | 475/80 X |

* cited by examiner

Primary Examiner—Roger Pang

(57) ABSTRACT

A hydromechanical transmission has a housing with a planetary gear system. A power output is operatively connected to the gear system for deriving power therefrom. A control is provided for operating the gear system in either a hydromechanical or a hydrostatic mode.

4 Claims, 2 Drawing Sheets

HYDROMECHANICAL TRANSMISSION

CROSS REFERENCE TO A RELATED APPLICATION

This application is based upon Applicant's Provisional Application Ser. No. 60/257,456 filed Dec. 21, 2000.

BACKGROUND OF THE INVENTION

There is a need for a compact, low cost variable transmission that overcomes the limitations of the current variable belt technology. The belts are subject to external water immersion. There is also a need to have a modular concept that minimizes the re-design work needed to adopt hydromechanical technology. There is also a need for a design that can be easily tailored to different variable ratio range requirements that may be required for different vehicles. There is also a need to eliminate the need for a transmission range box in order to reduce overall cost and simplify operation of the vehicle, and to eliminate inconvenience of mechanical shifting.

There is also a need to take the operating mode decision away from the operator in order to improve machine performance and life. The need also exists for a low cost method to provide neutral and smooth startup of the vehicle.

It is therefore a principal object of this invention to provide a hydromechanical transmission that can be operated in either a hydromechanical mode or a hydrostatic mode.

A further object of this invention is to provide such a hydromechanical transmission wherein the hydromechanical mode enables vehicle operation throughout the complete forward speed range without any need for operator clutching or shifting, and the hydrostatic mode enables vehicle operation in both forward and reverse in a limited speed range, but without any need for operator clutching or shifting.

SUMMARY OF THE INVENTION

The transmission of this invention is designed to be a very compact integrated continuously variable transmission package. It can be used as a complete transmission that covers a wide range of speeds and torques without the need for an additional mechanical range box, or it can be used as a portion of a complete transmission system integrated with other components or systems of a vehicle drive train, without the need for an additional mechanical range box.

This invention involves a transmission with a single operating range without an additional mechanical range box. This will be more convenient to the vehicle operator, and will also eliminate the possibility of operating in an inappropriate gear range that could reduce life or performance of the vehicle.

Through the specific design of this transmission, this invention inherently provides the ability to achieve zero vehicle speed and smooth startup without the need and additional cost of added components common in the current state of the art. (No start-up clutch needed.) This transmission provides a continuously variable ratio between the input and output speeds and torques. This is accomplished through a hydromechanical transmission mode for driving forward, and a hydrostatic transmission mode for driving reverse, but also forward up to a certain speed less than maximum speed.

In the hydromechanical mode, as the variable hydrostatic unit strokes from maximum negative displacement to maximum positive displacement, the vehicle speed will vary continuously from zero to maximum forward. In the hydrostatic mode, as the variable hydrostatic unit strokes from maximum negative displacement to maximum positive displacement the vehicle speed will vary continuously from maximum reverse to partial forward speed. In the hydrostatic mode the transition from forward to reverse can be achieved without any shifting.

Changing from the hydromechanical mode to the hydrostatic mode is accomplished through a sliding clutch or friction clutch, which can be actuated mechanically, hydraulically, or electromechanically. In the case of a sliding, positive engagement type clutch, the vehicle may need to be stopped before changing the clutch position. The actuation of the clutch could be operator controlled, or could be automated through the electronic control system for this transmission. The clutch can also be used for the purpose of disengaging the entire transmission from the power input (engine), by putting the clutch into a neutral position.

DESCRIPTION OF THE PREFERRED EMBODIMENT

Figure 1:
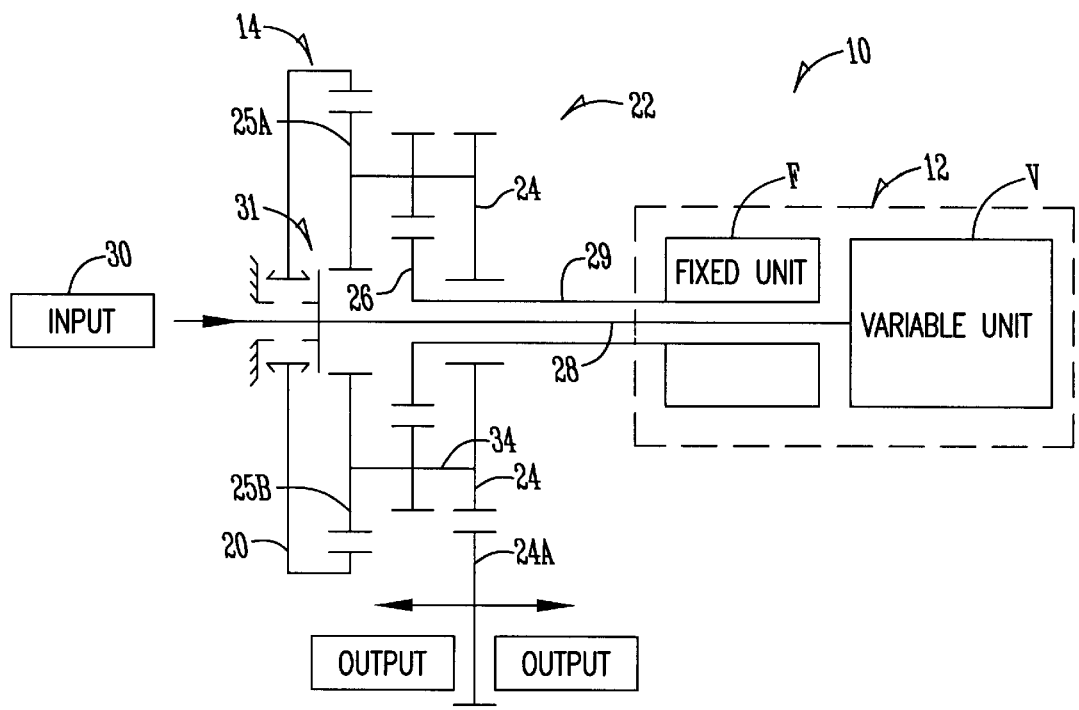
FIGS. 1, 2 and 3 are drive train schematic drawings which depict three different design variations.

With reference to FIG. 1, all the major components are arranged along a common shaft centerline. The relative connections to the planetary elements (ring, sun, carrier) shown here are optimized to achieve a compact package and a single centerline. This coaxial design minimizes the relative speeds between components. At the maximum output speed (forward) all components are rotating at nearly the same speed. It is possible to use many different planetary ratios to tailor the transmission ratio spread and speeds. Also, the absolute and relative displacements of the hydrostatic kits can be changed to optimize the transmission to the application.

In this invention an axial piston hydrostatic fixed kit is preferred because it facilitates connecting the variable unit shaft through the center of the fixed kit. A variable displacement axial piston unit would also work within the scope of this claim, but the design would be more complex and less compact. Note that the mechanical input can be made to either end of the transmission. The preferred input location is at the planetary end. This location will minimize the power transmitted through the long inner shaft connection to the variable unit to the input and the ring gear when engaged, resulting in a smaller and lower cost shaft.

The mechanical output is made through a set of gears from the carrier of the planetary to the output shaft, which preferably is located in parallel to the major components of the transmission. Alternatively a chain or belt could be used to transmit the power to the output. If vehicle installation requirements or restrictions apply, the output shaft could also be located perpendicular to the major centerline.

The hydromechanical transmission (hereinafter HMT) 10 of this invention includes a hydrostatic transmission 12 connected to a planetary gear set 14. The hydrostatic transmission 12, also referred to herein as a HST, includes a variable displacement hydraulic unit V connected to a fixed displacement hydrostatic unit F.

The planetary gear set 14 is believed to be well known in the mechanical arts and is therefore only summarily described herein. As best seen in FIG. 1, the planetary gear set 14 has a ring gear 20 rotatably mounted in a housing position not shown as anchored wall and a carrier plate assembly 22 rotatably mounted within the ring gear 20.

A plurality of radially and angularly spaced pins 34 extend from one of the outwardly directed opposing surfaces. Each of the pins 34 is generally parallel to the axis of rotation for the sun gear 26 and the ring gear 20. Compound planetary gears 25A, and 25B are rigidly mounted on the pins 34 which rotate within the carrier. As is conventional, the planetary gears 25A and 25B are generally cylindrical and have an outer diameter with a plurality of gear teeth thereon. Together the gears 25B engage and support the sun gear 26 between them. The sun gear 26 is mounted for rotation with the shaft member 29. As is known in the art of planetary gear sets, the carrier plate assembly 22 has voids and clearance holes where needed to accommodate the gears 25A and 25B to reduce the weight of the assembly. The carrier plate assembly 22 has output gear 24 mounted to it.

The axial piston hydrostatic fixed displacement unit F has its rotating assembly connecting the variable unit input shaft 28 through the center of the kit. The fixed unit F has a rotating assembly with an axial opening therethrough defined by the hollow shaft member 29.

Figure 2:
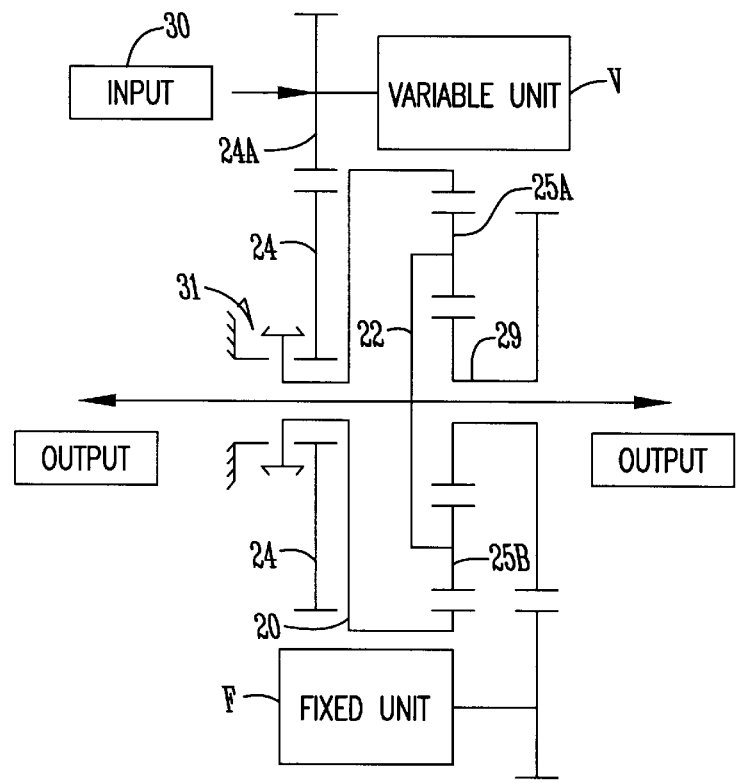
Figure 3:
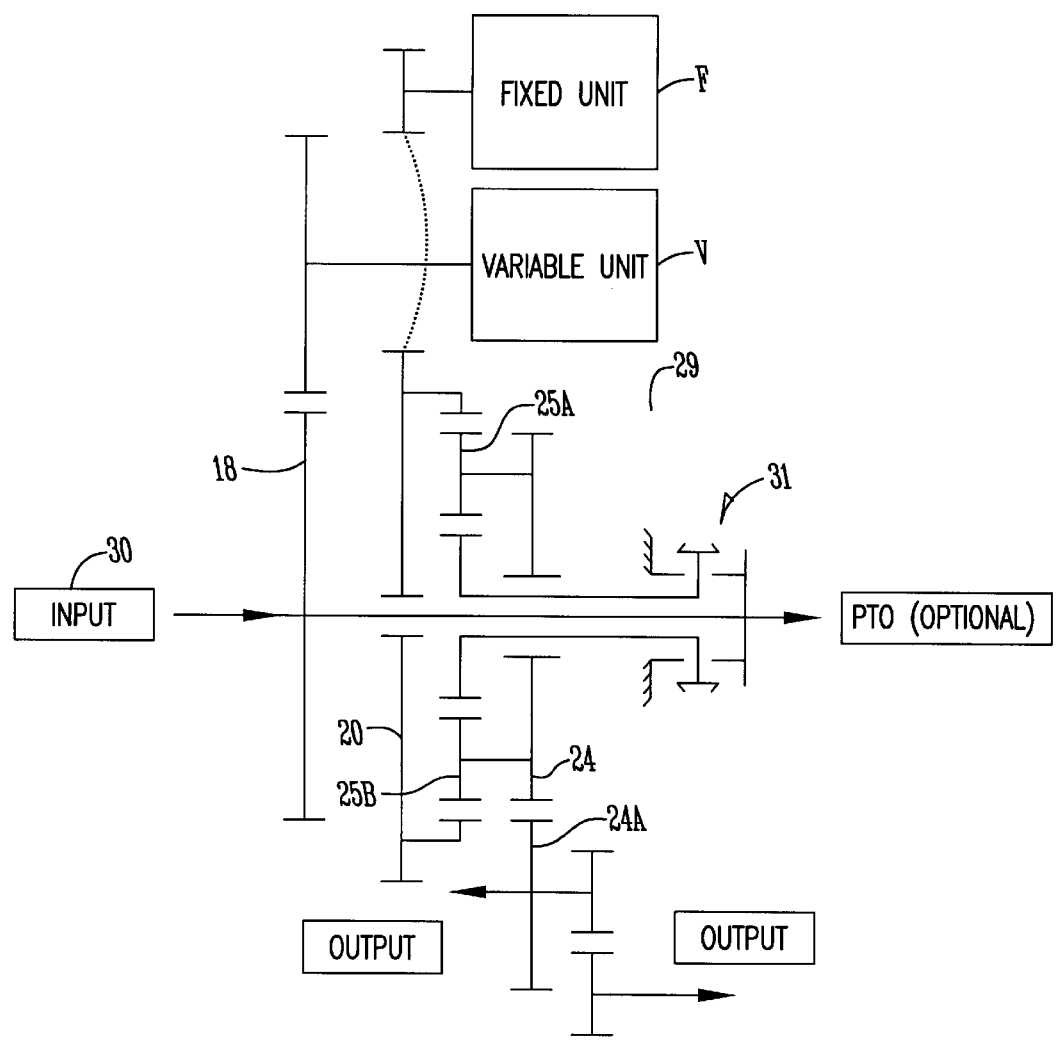

The mechanical input shown in FIGS. 1–3 is designated by the numeral 30, and can be comprised of a gear, chain or belt. The numeral 31 designates a clutch or shifting mechanism to permit the mode of operation to be established. The positions of clutch 31 in FIGS. 1–3 show the neutral position. Movement or shifting of clutch 31 in a left-hand direction (FIG. 1) causes the hydrostatic mode to be invoked; movement in a right-hand direction causes the hydromechanical mode to become operative.

In the neutral position, one element of the planetary is disengaged (free to rotate). With one leg of the planetary free to rotate, no torque can be generated and the vehicle will be in neutral.

In FIGS. 1 and 2, the clutch (31) selectively engages the ring gear with either the mechanical input (hydromechanical mode) or is grounded (locked) for hydrostatic mode.

In FIG. 3 the clutch selectively engages the sun gear instead of the ring gear.

With reference to FIG. 2, the major components are arranged on multiple shaft center lines in order to accomplish a shorter package for different installation needs. This also allows the planetary input speed to be different than the input speed to the variable unit through the appropriate selection of the gear ratio of the gear set between input shaft and planetary shaft. Furthermore this arrangement allows for a ratio between the fixed unit speed and the input to the sun gear of the planetary. This arrangement allows to better tailor the needs for different transmission ratios, and also gives more flexibility to the selection of the best displacements of the hydrostatic kits for best performance and lowest cost. Because neither of the hydrostatic kits requires coaxial shafts, there is flexibility in the kit design, i.e., axial piston or bent-axis designs could be used.

In FIG. 2, the input 30 is directed to the member 24 and 24A, and thence to ring gear 20 when clutch 31 is in the righthand position, thence through the planetary gears 25A back to the carrier 22, and thence to the output.

With reference to FIG. 3, the major components are also arranged on multiple shaft centerlines with the same advantages as described above. The input shaft, however, is connected to the planetary sun gear as opposed to the planetary ring gear. The transmission output is again taken off from the planetary carrier, whereas the fixed unit is connected to the planetary ring gear. The major advantage of this embodiment compared to FIGS. 1 and 2 is that the variable unit is not directly connected to the input shaft, but through a gear set, which allows for even more flexibility in the selection of the hydrostatic units especially the variable unit, because the input speed to the variable unit can be adapted through the appropriate selection of the gear ratio from the input. Alternative to the input gear set, a chain drive or belt drive could be used. Because neither of the hydrostatic kits requires coaxial shafts, there is flexibility in the kit design, i.e., axial piston or bent-axis designs could be used.

In FIG. 3, the location of F and V have been changed with respect to FIG. 2. The F and V units are connected to ring gear 20 and drive gear 18, respectively.

It is seen that this invention provides the following new features and advantages:

1) A single mode hydromechanical transmission that fulfills the needs for an all range continuous variable transmission.

2) A single mode hydromechanical transmission that fulfills the speed and torque requirements without needing an additional mechanical range box.

3) A single mode hydromechanical transmission that eliminates the need for a start up clutch.

4) A single mode hydromechanical transmission that fulfills the speed and torque requirements by adding a hydrostatic mode for reverse and low speed forward.

5) A single mode hydromechanical transmission that fulfills the needs for an all range continuous transmission through the incorporation of a sliding or friction clutch from the hydromechanical mode to the hydrostatic mode.

6) A single mode hydromechanical transmission that fulfills the needs for an all range continuous transmission through the incorporation of a sliding or friction clutch to change from the hydromechanical mode to the hydrostatic mode, and where the clutch is actuated mechanically through a micro controller.

7) A single mode hydromechanical transmission that fulfills the needs for an all range continuous transmission through the incorporation of a sliding or friction clutch to change from the hydromechanical mode to the hydrostatic mode, and where the clutch is actuated mechanically through a set of mechanical linkages.

8) A single mode hydromechanical transmission where the input speeds to the planetary and variable unit are different through the use of a gear set, or chain drive, or belt drive.

It is therefore seen that this invention will achieve at least all of its objectives.

I claim:

1. A hydromechanical transmission, comprising, a housing having a planetary gear system, means for inputting power to the gear system, and means for operating the gear system including a single clutch operatively connected to the gear system for alternatively providing power output from the gear system in a hydromechanical or hydrostatic mode without the use of an additional clutch.

2. A hydromechanical transmission, comprising, a housing having a planetary gear system, means for inputting power to the gear system, means for deriving power output from the gear system, and means for operating the gear system including a single clutch operatively connected to the gear system for alternatively providing power output from the gear system in a hydromechanical or a hydrostatic mode without the necessity of clutching or shifting of gears within the gear system.

3. A hydromechanical transmission, comprising, a housing having a planetary gear system, means for inputting power to the gear system, means for deriving power output from the gear system, and means for operating the gear system including a single clutch operatively connected to the gear system for alternatively providing power output from the gear system in a hydromechanical or a hydrostatic mode in a forward direction without the use of an additional clutch.

4. A hydromechanical transmission, comprising, a housing having a planetary gear system, means for inputting power to the gear system, means for deriving power output from the gear system, and means for operating the gear system in a hydromechanical mode throughout a complete forward speed range without any need for operator clutching or shifting, and means for operating the gear system in a hydrostatic mode in both forward and reverse directions without the need for operator clutching or shifting.

* * * * *

UNITED STATES PATENT AND TRADEMARK OFFICE
CERTIFICATE OF CORRECTION

PATENT NO.   : 6,626,785 B2
DATED        : September 30, 2003
INVENTOR(S)  : Frederic W. Pollman It is certified that error appears in the above-identified patent and that said Letters Patent is hereby corrected as shown below:

Column 5,
Line 24, insert the word --- additional -- before the word "clutching".

Signed and Sealed this

Eleventh Day of November, 2003

JAMES E. ROGAN
*Director of the United States Patent and Trademark Office*